(12) United States Patent
Wilson et al.

(10) Patent No.: US 7,935,376 B2
(45) Date of Patent: May 3, 2011

(54) WAXY WHEAT PRODUCTS AND PROCESSES FOR PRODUCING SAME

(75) Inventors: Lori Ann Wilson, Hickory Corners, MI (US); John William Colyn, Battle Creek, MI (US); Grace Lai, Portage, MI (US); Craig Morris, Pullman, WA (US)

(73) Assignees: Kellogg Company, Battle Creek, MI (US); The United States of America as represented by the Secretary of Agriculture, Washington, DC (US)

( * ) Notice: Subject to any disclaimer, the term of this patent is extended or adjusted under 35 U.S.C. 154(b) by 827 days.

(21) Appl. No.: 11/356,763

(22) Filed: Feb. 17, 2006

(65) Prior Publication Data

US 2006/0141118 A1   Jun. 29, 2006

Related U.S. Application Data

(62) Division of application No. 09/751,397, filed on Jan. 2, 2001, now abandoned.

(60) Provisional application No. 60/173,732, filed on Dec. 30, 1999.

(51) Int. Cl.
*A23L 1/168* (2006.01)

(52) U.S. Cl. ........ 426/507; 426/506; 426/508; 426/618; 426/619; 426/620; 426/621

(58) Field of Classification Search .................. None
See application file for complete search history.

(56) References Cited

U.S. PATENT DOCUMENTS

| | | | |
|---|---|---|---|
| 2,526,792 A | 10/1950 | Aldeman | 99/81 |
| 2,930,697 A | 3/1960 | Miller | 99/80 |
| 3,996,384 A * | 12/1976 | Reesman et al. | 426/96 |
| 4,403,018 A | 9/1983 | Alfenaar et al. | 429/34 |
| 4,693,055 A | 9/1987 | Olsen, Jr. et al. | 53/443 |
| 4,737,371 A | 4/1988 | Bookwalter | 426/462 |
| 5,045,328 A | 9/1991 | Lewis et al. | 426/28 |
| 5,360,619 A | 11/1994 | Alexander | 426/242 |
| 5,391,388 A | 2/1995 | Lewis et al. | 426/618 |
| 5,464,647 A | 11/1995 | Messick | 426/618 |
| 5,520,949 A | 5/1996 | Lewis et al. | 426/618 |

(Continued)

FOREIGN PATENT DOCUMENTS

EP   0338239   10/1989

(Continued)

OTHER PUBLICATIONS

LaBell, Fran, Healthy Barley Foods Multiply, in Prepared Foods (Nov. 1997), 87.

(Continued)

*Primary Examiner* — Lien Tran
(74) *Attorney, Agent, or Firm* — Dickinson Wright PLLC (57) ABSTRACT

This invention relates to a storage stable buoyant waxy grain wherein the waxy grain is waxy triticale and waxy wheat. The starch in the waxy grain is gelatinized throughout and the cooked waxy grains of this invention can be stored for prolonged times in air tight or conventional cereal containers having a liner without acquiring rancid odors or tastes even in the absence of preservatives that inhibit the development of rancidity. Preferably, the waxy wholegrain is a waxy wheat having a protein content of no more than 14% by dry weight. The processes for preparing the waxy wholegrain food products of this invention are also described.

35 Claims, 4 Drawing Sheets

U.S. PATENT DOCUMENTS

| | | | | |
|---|---|---|---|---|
| 5,972,413 A | * | 10/1999 | Whitney et al. | 426/618 |
| 6,042,867 A | | 3/2000 | Hoshino et al. | 426/622 |
| 6,139,894 A | | 10/2000 | Hoshino et al. | 426/549 |
| 6,156,365 A | | 12/2000 | Liwszye | 426/510 |
| 6,287,626 B1 | * | 9/2001 | Fox | 426/615 |

FOREIGN PATENT DOCUMENTS

| | | |
|---|---|---|
| JP | 6125669 | 10/1994 |
| WO | WO 94/22329 | 10/1994 |
| WO | WO 96/19117 | 6/1996 |

OTHER PUBLICATIONS

Connor and Connor, The Dietary Prevention and Treatement of Coronary Heart Disease, in Coronary Heart Disease, pp. 43-64, W.E. Conor and J.D. Bristow, Eds. J.B. Lippincott, Philadelphia (1984).

Newman, et al., The Hypocholesterolemic Function of Barley β-Glucans, in Cereal food World (10:883-884) (1989).

Feneley, Accelerated Shelf-Life Testing of a Ready to Eat Cereal, in Masters Thesis, Dept. of Food Science and Human Nutrition, Michigan State University (1998).

Fritsch and Gale, Hexanal as a Measure of Rancidity in Low Fat Foods, in J. Amer. Oil Chem. Soc., 54:225 (1976).

Yamamori, et al., "Production of a Waxy Wheat by Genetically Elmininating Wx Proteins", Gamma Field Symposia No. 33 (reprinted), 1994 Institute of Radiation Breed, NIAR, MAFF, Japan (1994), pp. 63-74.

Nakamura, et al., "Production of Waxy Wheats", Molecular Gene Genetic 248, pp. 253-259 (1995).

Y. Pumeranz, "Wheat Chemistry and Technology", 1988, pp. 10, 16-17.

Miecke W., Vorwerck K.: "Dämpfen and Flockieren von Getreideprodukten. Steaming and flacking of grain products", Getreide, Mehl and Brot, vol. 33, No. 5, 1979, pp. 123-127 XP009059249.

Yasui T. et al. "Amylose and Lipid Contents, Amylopectin Structure, and Gelatinisation Properties of Waxy Wheat (Triticum Aestivum Starch)", Journal of Cereal Science, Academic Press, Ltd., vol. 24, No. 2, 1996 pp. 131-137 XP000863063.

Fujita S. et al. "Thermal and Crystalline Properties of Waxy Wheat (Triticum Aestivum L.) Starch", Journal of Cereal Science, Academic Press Ltd., vol. 27, No. 1, 1998 pp. 1-5, XP000922905.

Robert B. Fast & Elwood F. Caldwell, "Breakfast Cereals and How They are Made", American Association of Cereal Chemists, Inc., St. Paul Minnesota, USA 1990 pp. 250-259.

Fujita S. et al. "Thermal and Crystalline Properties of Waxy Wheat (Triticum Aestivum L.) Starch", Journal of Cereal Science, Academic Press Ltd., vol. 27, No. 1, 1998 pp. 1-5, XP000922905.

* cited by examiner

WAXY WHEAT PRODUCTS AND PROCESSES FOR PRODUCING SAME

CROSS-REFERENCES TO RELATED APPLICATIONS

This patent application is a divisional of and claims priority to U.S. patent application Ser. No. 09/751,397, filed Jan. 2, 2001 now abandoned, which claims the benefit of U.S. provisional patent application No. 60/173,732 filed Dec. 30, 1999 which are incorporated herein by reference in their entirety.

FIELD OF THE INVENTION

This invention relates to a cooked, storage stable, buoyant grain food product prepared from waxy wheat. The cooked waxy wheat is storage stable, e.g., it can be stored in tightly closed or air tight containers for prolonged periods of time without becoming rancid, even without the addition of preservatives that inhibit the development of rancidity. Preferably, the waxy wheat has less than 10% amylose starch. The waxy wheat may further have a protein content of less than 14% by dry weight of the harvested wheat. The processes for preparing the cooked waxy wheat of this invention are also described.

BACKGROUND OF THE INVENTION

Grains are a valuable source of micro and macro nutrients, e.g., carbohydrates, proteins, vitamins, antioxidants and both soluble and insoluble fiber, but raw grain, e.g., barley, maize, oat, rice, sorghum, triticale and wheat, is generally unpalatable and not easily digested. Thus grain is usually processed by cooking to a form that is more easily digested and also possesses pleasing organoleptic properties of appearance, aroma, taste and texture. The nutritional value and organoleptic properties of the processed grain food product and their ability to be stored for long periods of time depend on a combination of factors, e.g., on the type of grain that is processed, e.g., whether the grain possesses high levels of fiber and antioxidants, the levels of lipase and peroxidase, the types and amounts of starch in the processed grain, e.g., amylopectin or amylose, and the steps used to process the grain.

Grains are a good source of fiber and a diet high in fiber has been associated with various health benefits, e.g., lowering cholesterol, modulating blood sugar levels, which is an important consideration for persons with diabetes, and reducing the risk of colin cancer (LaBell, Healthy Barley Foods Multiply, 87 (November 1997). High serum cholesterol is a recognized risk factor for heart disease and is reversible by diet in a majority of cases (Connor and Connor, "The Dietary Prevention and Treatment of Coronary Heart Disease." In: Coronary Heart Disease, W. E. Connor and J. D. Bristow, Eds. J. B. Lippincott, Philadelphia, 1984). Three factors modified in a diet to reduce cholesterol include: reducing total fat, increasing the ratio of polyunsaturated to saturated fatty acids, and consuming soluble dietary fiber. Dietary fiber consists of a mixture of components which vary in degree of solubility in water and soluble fibers are well-documented as having beneficial hypocholesterolemic benefits (Newman et al., Cereal Foods World, 34(10)883-886 (1989)). Components that are considered generally soluble in water include pectin, gums, and mixed linked (1-3) (1-4)-β-glucans, such as, e.g., the β-glucans found in the oat bran and in endosperm cell walls of barley. About 70% of the barley endosperm cell walls are β-glucans. However, the hypocholesterolemic effects of isolated β-glucans and the hypocholesterolemic effects of certain milling fractions of grain are not the same as those of a wholegrain product, which contains intact endosperm cell walls (Newman et al., "The Hypocholesterolemic Function of Barley β-Glucans," Cereal Food World, 34(10):883-884, 1989).

Grains also provide antioxidants, which are thought to be protective against cardiovascular disease and various cancers. Tocopherols, e.g., Vitamin E, is a potent antioxidant. In its natural food state, Vitamin E is actually a family of several different tocopherols, alpha, beta, epsilon, and gamma. Animal and in vitro studies indicate that Vitamin E supplementation reduces the risk of chemical- and radiation-induced cancers.

The starch makeup of grains can affect the organoleptic characteristics of processed grains. Grains contain a combination of two kinds of starch, amylose and amylopectin. Amylose is a straight chain glucose polymer having $\alpha$-1,4 linkages. Amylopectin is a branched chain glucose polymer with 1-6 linkages at the branching points. Grains designated "waxy" or "non-waxy" differ in their content of amylose and amylopectin starches. Grains having 10% or less amylose are designated "waxy." Waxy varieties exist for barley, maize, oat, rice, sorghum, triticale and wheat, and some have been used previously in a variety of methods to produce palatable and digestible food products.

Unlike raw grains, which may be stored for long periods of time without deteriorating, provided the grain is kept dry, food products from processed grains are often subject to mold and bacterial growth as well as oxidative and enzymatic degradation. Thus many processed grains and food products comprising processed grains cannot be stored for long periods without becoming rancid and losing their pleasing appearance, aroma, taste and texture, unless they are treated with preservatives.

U.S. Pat. No. 2,526,792 to Aldeman discloses the preparation of a pearled waxy barley-based cooked and puffed product. The method described does not include steps that would make the product shelf stable for prolonged periods of time.

U.S. Pat. No. 2,930,697 to Miller discloses a process wherein grain, e.g., wheat, oat, sorghum and rye is soaked to increase its moisture level, flattened to break the epidermis and endosperm and then cooked with steam or with water to uniformly gelatinize the starch. Miller does not disclose the use of waxy grains.

U.S. Pat. No. 4,603,055 to Karowski et al. is directed to the production of cereal flakes that are thicker than normal toasted flakes and have a high flake integrity that withstands packaging, shipping and dehydration cooking. Karowski et al. produce a multiple grain based flaked cereal from a plurality of grain types that are cut into pieces and then steamed and tempered for 15-20 minutes but the grains are only partially gelatinize the grain prior to rolling into a flake.

U.S. Pat. No. 5,391,388 to Lewis et al. discloses the preparation of a waxy barley-based porridge-like breakfast cereal wherein less than 30% of the starch is gelatinized. This is a partially gelatinized, partially cooked quick cooking hot cereal. The patent also discloses a non-crispy cold breakfast cereal food.

U.S. Pat. No. 5,360,619 to Alexander relates to cereal foods ingredients from waxy barley. The cereal food products of this patent are not gelatinized throughout and the grain is pearled and thus lacks the outer parts of the grain. The outer part of the grain is a source of fiber and therefore by pearling, the grain reduces the proportion of beneficial fiber in the cereal food ingredients of this patent.

European patent application 0 338 239 to inventors Short and Wilkinson, describes a method for producing a microwaveable half product and a puffed food product from flour of one or more grains, one of which being a whole ground waxy maize. While the process disclosed therein fully gelatinizes the starch, the product is prepared from a dough and the products are not storage stable. They rapidly undergo enzymatic and oxidative rancidity resulting in a product having a taste, odor and texture that is not acceptable to consumers.

International application WO 96/19117 (inventor Lewis) discloses a method that includes a step for fully gelatinizes waxy grains, either whole or subdivided. However, the product cannot be stored for prolonged periods without becoming rancid without additives to inhibit the development of rancidity.

U.S. Pat. No. 4,737,371 discloses a treatment for protecting grain from enzymatic deterioration by inactivation of lipolytic and oxidative enzymes prior to milling into a shelf stable high fat flour. The grain is soaked for a prolonged period to raise the moisture content to 13-17%, then quickly heated, cooled and stored or milled into a flour. The patent does not disclose the use of waxy grains.

U.S. Pat. No. 4,413,018 to Webster et al. discloses a process for imparting shelf stability to oat groats wherein the groats are heated for a time and temperature sufficiently intense to inactivate the enzymes with causing the oxidative reaction process to go forward. The oats are treated to reduce the moisture level by heating over a period of 1-2 hours, then slowly cooled and thereafter steamed or boiled for 5-10 minutes. This patent also does not disclose waxy grains.

U.S. Pat. Nos. 6,139,894 and 6,042,867 both to Hoshino et al. discloses the use of a flour blend that comprises a waxy wheat flour prepared from a waxy wheat having less than 10% amylose. The generation of this waxy wheat is described in Japanese Patent Application Laid Open No. 6-125669. The patents disclose the use of waxy wheat flours in bread cakes and noodles as well as deep fried foods, steamed Chinese Manju, dough sheets, okonomi-yaki and takoyaki and that the products prepared from the waxy wheat flour blends have particularly desirable properties. The waxy wheat flour is always used as a component in a flour blend and is never more than 80% of the blend. The inventors do not describe a process for cooking the waxy wheat prior to milling.

While heating may seem a straightforward alternative to deactivating enzymes, U.S. Pat. No. 6,156,365 to Liwszyc discloses that some heat treatments, while capable of inhibiting the enzyme, accelerate the oxidative rancidity. Liwszyc discloses a process for preparing a fully and uniformly gelatinized hulled non-waxy oat comprising adding water to the hulled oats and cooking the oats for a time and at a temperature to fully gelatinize the oats. This patent deactivates active enzymes in oat bran by steaming hulled oats in the presence of heat (100° C., 212° F.) for 1 to 3 hours and discloses that further harsh treatment of hulled oats leads to the destruction of antioxidants and shortening the shelf life of the finished product. The flakes produced by the described method are reported to be more water absorbent than traditional oat flakes. This patent does not disclose waxy grains.

The methods described herein are suitable for application to waxy grains that may or may not be pearled but are particularly useful for processing waxy grains that are high in lipases and peroxidases, e.g., waxy wheats. The processes of this invention produce a digestible, palatable waxy grain food product that is a storage stable, gelatinized throughout, and that is organoleptically acceptable to consumers. In addition to being storage stable, the products prepared from grain that is not pearled also provide the amounts of fiber and tocopherols found naturally in grain as harvested as well as high levels of antioxidants. This is especially true for grains where the fibers are found in the bran of the grain, e.g., in oat bran.

SUMMARY OF THE INVENTION

This invention relates to a palatable, easily digested, storage stable, buoyant, food product produced from waxy grains, particularly waxy wheat. Various grains are available as waxy varieties, for example, barley, maize, rice, sorghum, triticale and wheat (see, e.g., Yamamori et al., Production of a waxy wheat by genetically eliminating wx protein, Gamma Field Symposia No. 33 (reprinted), 1994 Institute of Radiation Breeding, NIAR, MAFF, Japan. (July 1994); Nakamura et al. "Production of waxy wheats" Molecular Gene Genetic 248, pp. 253-259 (1995)). Grains are an valuable source of fiber, $\beta$-glucans (e.g., in the endosperm walls of barley and the bran of oat) and antioxidants. In view of the desirable characteristics of waxy grains and the advances in plant technology it is likely that other grains, e.g., a waxy oat, will be bred by either traditional breeding techniques or by genetic modification using recombinant DNA technology and the processes described herein will be applicable to newly developed waxy grains. The processes are especially applicable to those having lipases and peroxidases at high levels, e.g., levels that are about as high or higher than those in non-waxy or waxy wheats, barleys and oats.

The products of this invention display enhanced shelf life, crispness, bowl life and buoyancy as compared to products prepared from non-waxy varieties. Preferably, the uncooked waxy grain has high levels of total and soluble fiber and high levels of antioxidants, e.g., tocopherols, and these levels are preserved in the cooked waxy grain product of this invention.

Waxy grains generally have no more than 10% amylose and may be selected from wheat, rice, oat, sorghum (millet), maize, and barley. Not all grains have a hull, e.g., wheat. But of the waxy grains that do contain a hull, particularly useful varieties are waxy hulless varieties. The hulless gene produces a grain without an adhering hull. Thus it is not necessary to pearl hulless grain to obtain a palatable grain product that is acceptable to consumers. Because it is not necessary to dehull a hulless grain, the resulting product contains essentially the same amount of fiber as is found in the grain as harvested. Thus food products with increased amounts of total dietary fiber as compared to products made from pearled grains, are obtained.

The waxy grain products of this invention have many characteristics desired by consumers. For example, the waxy grain product is storage stable, i.e., it can be stored in airtight containers or conventional cereal containers having a liner without becoming rancid, even without the addition of other substances, e.g., tocopherols, BHT, etc., that are commonly used to inhibit the development of rancid odors and tastes. Thus the products of this invention have an extended shelf-life. In addition, the finished products of this invention have a unique texture, having significantly less surface roughness and significantly enhanced buoyancy and crispness as compared to non-waxy products. When exposed to a liquid, such as, e.g., milk, the products produced by the methods of this invention display an enhanced crispness and buoyancy, remaining buoyant longer than similar products made with varieties of non-waxy grain.

The product produced in one embodiment of this invention is in the form of integral whole kernels that are gelatinized throughout. In alternate embodiments the product is a flake, a half product or a puffed food product formed from a dough of cooked, waxy grain prepared as described herein. Preferably, the product has high levels of fiber and tocopherols (vitamin E) provided by the grain itself.

The methods of this invention are suitable for waxy grains that may or may not be pearled. Pearling removes various proportions of the bran from the outer layers of whole grain. For example, a small amount of the bran may be removed, accounting for a loss of only about 1% of the dry weight of the grain, or essentially all the bran may be removed producing a white grain with essentially no brown color from the bran layer. Pearled grains produce a product that is preferred by some consumers.

The products produced in one embodiment of this invention include a wholegrain wheat product in the form of integral kernels that are gelatinized throughout. In alternate embodiments the product is a ground meal of whole cooked waxy wheat, a flake, a half product or a puffed food product formed from a dough of the processed wholegrain waxy wheat.

BRIEF DESCRIPTION OF THE DRAWINGS

FIGS. 3A and B depict the moisture (3A) and water activity (3B) of a waxy barley flake processed by the methods of this invention at various time during storage for 12 months at 70° F. (21.1° C.) and 35% relative humidity
FIGS. 4A and B depict the moisture (4A) and water activity (4B) of a waxy barley flake processed by the methods of this invention during storage for 12 weeks at 100° F. (37.8° C.), and 35% relative humidity.

DETAILED DESCRIPTION OF THE INVENTION

The methods of this invention use waxy grains having no more than 10% amylose. Various grains are available as waxy varieties, for example, barley, rice, sorghum and wheat. In view of the desirable characteristics of waxy grains and the advances in plant technology it is likely that other grains, e.g., a waxy oat will be bred by either traditional breeding techniques or by genetic modification using recombinant DNA technology and the processes described herein will be applicable to newly developed waxy grains. The processes are especially applicable to waxy grains having high levels of lipases and peroxidases, e.g., levels that are about as high or higher than those in non-waxy or waxy wheats, barleys and oats. Particularly useful waxy grains are waxy wheat. The waxy wheat useful in this invention are those having no more than 10% amylose. The waxy wheat may comprise a protein content of less than 20%. A particularly useful waxy wheat is a waxy wheat having a protein content of less than 14% by dry weight. Without wishing to be bound by theory, a protein content of less than 14% by dry weight provides the wheat with properties that facilitate its transition through the methods of this invention. While wheat need not be pearled in order to generate a organoleptically acceptable product, the methods described herein are also suitable for pearled waxy wheat. Pearling removes various amounts of the outer layers of the grain. In general, removing the outer grain layers produces a whiter grain with a texture that is desirable by some consumers.

Wheat does not comprise a hull and therefore does not requiring pearling. Other grains are available having a hulless genotype, which produce kernels without adhering hulls, and thus would not require pearling to produce a palatable product. Pearling removes various amounts of the outer layers of the grain. For example, a small amount of the bran may be removed, accounting for only about 1% of the dry weight of the grain or essentially all the bran may be removed producing a white grain with essentially no brown color from the bran layer. In general, removing the outer grain layers produces a whiter grain with a texture that is desirable by some consumers. However, pearling may produce a nutritionally inferior product because the pearled product contains significantly less fiber, in addition to less B vitamins, than the grain as harvested. Hulless varieties of grain have been used to prepare food products, but even the hulless varieties have been pearled in some processes (U.S. Pat. No. 5,360,619, supra) to produce the food products.

Most grains, e.g., barley, maize, millet, oat, rice, sorghum, and wheat, have varieties that are waxy, some that are both waxy and hulless. Waxy barley varieties include, e.g., Waxiro, CDC Candle, Merlin, and HB803, prowashapawana. Waxy wheat varieties and their production have been described in Yamamori et al., Production of a waxy wheat by genetically eliminating wx protein, (July 1994) and Nakamura et al. "Production of waxy wheats" Molecular Gene Genetic 248, pp. 253-259 (1995) and in Japanese Patent Application Laid Open No. 6-125669. Waxy wheats are known, e.g., Bai Huo (HRS, Wx-D1) and Kanto 107 (SRS, Wx-A1 and Wx-B1 null). Preferred waxy wheat comprises less than about 10% amylose. Waxy wheats suitable for this invention may also be generated by crossing Bai Huo(HRS, Wx-D1) and Kanto 107 (SRS, Wx-A1 and Wx-B1 null) (Nakamura 1995, incorporated herein by reference) and Penawawa, or variants thereof and preferably comprise one or more Wx-D1, Wx-A1 or Wx-B1 alleles or variants thereof.

The methods of this invention are applicable to any waxy grain but are particularly useful for producing digestible, shelf stable grain products from waxy grains that have high levels of lipases and peroxidases in their raw state. High levels of lipases are about the levels found in, e.g., oats, barleys and wheats. Generally, oats are regarded as having the highest levels of lipases and peroxidases followed by barley and then wheats. The methods described herein produce a palatable, digestible, storage stable waxy grain product that remains stable without the addition of substances that inhibit rancidity. The methods also produce a waxy grain product that has an extended bowl life, staying buoyant, crispy and fracturable in milk for at least about 3 minutes, preferably at least about 5 minutes.

Without wishing to be bound by theory, the processes of this invention are thought to inactivate the lipases and peroxidases in the processed grains of this invention wherein the levels of lipase and peroxidase activity being sufficiently low so that the final waxy grain products do not acquire rancid tastes or odors, even after storage for prolonged periods of time in air tight or conventional cereal containers having a liner, without the addition of chemical additives, e.g., tocopherols or BHT etc., to inhibit the development of rancid odors and tastes. Preferably, the products are stable for at least 6 months, e.g., do not acquire rancid tastes or odors for at least 6 months at ambient temperatures in conventional cereal containers having a liner such as e.g., a Kellogg's Corn Flakes® or Kellogg's Rice Krispies® box but the liner does not contain preservatives. More preferably, the products are stable for at least 12 months at ambient temperatures in a conventional cereal box having a liner without preservatives.

Rancidity may be determined easily by taste or odor, or both taste and odor, or by using standard means, e.g., gas chromatography, to determine the amount of hexanal produced, e.g., by lipid oxidation, in either the headspace of the packaged grain or in the grain itself. Hexanal accumulates linearly until a certain time, known as the time of break point, wherein the rate of accumulation begins to deviate from linearity and increase exponentially. The break point of rapid hexanal accumulation is close to the time when consumers begin to detect rancidity. Feneley, *Accelerated Shelf-Life Testing of a Ready to Eat Cereal*, Masters Thesis, Dept. of food Science and Human Nutrition, Michigan State University (1998); Fritsch and Gale, "Hexanal as a measure of rancidity in low fat foods", J. Amer. Oil Chem. Soc. 54:225 (1976). Furthermore, the product is not only storage stable but also has an enhanced buoyancy. The product of this invention remains buoyant in a liquid, e.g., milk, longer than a product prepared from a non-waxy grain, particularly a barley, or a waxy grain, particularly waxy barley, prepared by other methods. The products of this invention have a bowl life, measured by a crispy, fracturable and buoyant character, in milk for at least 3 min. and preferably for at least 5 min.

In one embodiment of this invention, the waxy grain, particularly a waxy wheat, is in the form of whole grains, i.e., not subdivided during processing, and thus a product that resembles an whole grain in its natural form, is obtained. The product is storage stable and buoyant and the starch within the grain is gelatinized throughout, the grain appears translucent. In this method the harvested, waxy grain is hydrated with heat in, e.g., a rotary cooker or a steaming screw, to increase the moisture content to about 11 to 16%. The grain is heated at 95° C. to about 110° C., for about 5 to about 15 min. For example, the grain may be steamed for about 5 to about 15 minutes at about 15 to about 25 psi, preferably 16-17 psi. Preferably, the grain is steamed for 7 to 10 minutes at 16 to 17 psi. The heated grain may be left to temper at ambient temperature in a holding bin. In one embodiment, the heated grain is tempered hot, about 160 to 200° F. (94° C.), for 45 to 90 minutes and then bumped. More preferably, the heated grain is tempered at about 165° F. (74° C.) for about 1 hour. The tempered grain is then bumped lightly in a bumping mill. Preferably, the tempered grain is bumped just enough to crack the pericarp.

The heated grain, either bumped or unbumped, is then gelatinized throughout, such that it appears translucent. Gelatinization may be achieved under a variety of cooking conditions wherein the ranges of temperature, time, pressure and moisture are varied, e.g., by using a cooker-extruder followed by direct expansion. Preferably the heated grain is cooked for about 30 minutes to about 90 minutes at about 200° F. (94° C.) to about 350° F. (177° C.) under pressure of about 15 to 20 psi to gelatinize the starch throughout the grain. More preferably, the grain is cooked in a rotary cooker at 260° F. (127° C.) for about 1 hour under 15-17 psi. The cooked gelatinized grains are translucent throughout. After the grains are gelatinized throughout the grain is cooled. The individual cooled gelatinized grains are separated and then dried to a moisture content of about 18%-28%. Preferably, the gelatinized grains are dried to a moisture content of about 18-20%. The grain is then equilibrated for about 1 hour under ambient conditions and then rolled through a roller mill to a desired thickness. Preferably, the thickness of the rolled grain is about 0.002 to about 0.006 inch. The grain is then dried, preferably to a moisture content of about 16-10% and then equilibrated for 24 hours. The resulting product is a storage stable, waxy grain half product that is in the form of integral grains that does not require the addition of substances to inhibit the development of rancidity. The half product may be toasted or puffed using any method that is known in the art. For example, the product may be expanded using a fluidized bed of air, or a puffing tower. The puffed or toasted product may be eaten alone or with hot or cold milk. The puffed product has pleasing organoleptic properties, including but not limited to a crisp texture. The toasted or puffed product has a moisture content of about 2.5-3%, a low density and has enhanced buoyancy in addition to the enhanced crispness and storage stability, as compared to a product prepared from a non-waxy grain. The product remains buoyant in liquid, e.g., milk for at least 3 min. and preferably at least 5 min. The waxy grain may be pearled or unpearled prior to hydrating with heat. Preferably the waxy grain is unpearled. Preferably the pearled grains is pearled from about 1% to about 30% of the dry weight of the waxy grain.

In an alternate embodiment, the gelatinized grains are prepared essentially as described supra, but rather than bumping or equilibrating at ambient temperatures and rolling the gelatinized grains that have a moisture content of 18-28%, they are mixed with another grain or soy flour or protein sources and water to form a composition which is extruded and dried to form a half product. The half product may be subsequently flaked and toasted or puffed.

Alternatively the harvested, waxy grain, whether pearled or unpearled, may be hydrated with heat in, e.g., a rotary cooker or a steaming screw, by steaming the grain for about 5 to about 15 minutes, preferably about 10 minutes, at about 203° F. (95° C.) to about 230° F. (110° C.), e.g., by steaming at about 15 to about 25 psi, preferably 16-17 psi. The heated grains may then be mixed with water and cooked for 30-90 minutes, preferably about 50 minutes, under about 15-25 psi, preferably 20 psi. The moisture content of the grain after cooking is about 30%. The cooked grain is then dried by conventional means to a moisture content of about 18-28% preferably about 18%-20%. For example, the cooked grain is held in a tempering vessel 200 F-160 F for one hour. The tempered grain is then bumped through a roller mill to a desired thickness of 0.030-0.034 in. Thereafter, the bumped grain is dried further to a moisture content of about 10-16%. The bumped grain may be dried by conventional means, e.g., at 200° F. (93° F.) for about 10-20 minutes in a dryer. The dried bumped grain is then tempered for 8-12 hours at ambient temperatures. Once the product is tempered it may be further toasted or puffed by conventional means. Preferably at about 380° F. (193° C.) to about 700° F. (371° C.) for 15-25 sec. More preferably at about 400° F.-450° F. (204-232° C.) for 15-25 sec.

In another embodiment of this invention the cooked gelatinized waxy grains are processed into a storage stable breakfast cereal or snack, such as, e.g., flakes, shreds, puffs, nuggets, strips, or chips, which are shelf stable even without the addition of substances to inhibit the development of rancidity. In this embodiment, the waxy grains are prepared as set forth supra but instead of separating the individual cooked gelatinized grains, they are cooled and then kneaded with low shear, similar to the process used for pasta, to form dough. Preferably, the kneading is done with a screw and die and then put through a pasta machine, which causes slight puffing and air incorporation. The dough is cooled at ambient temperatures and may be formed into any suitable shape. For example, the kneaded dough may be formed into pellets then dried and puffed, or dried and then flaked and toasted. Alternatively, the dough may be directly expanded at the die face then dried and optionally toasted.

In a another embodiment of this invention the steamed waxy wheat may be ground into a meal of a desired consistency, e.g., a coarse or fine meal of the whole steamed grain, prior to gelatinization. The meal may be gelatinized and the gelatinized product then shaped into a desired shape which may be further puffed or toasted. For example, the meal may be gelatinized in a cooker extruder having a die face, and then directly expanded at the die face. The meal may also be gelatinized in, e.g., a rotary cooker and the gelatinized product cooled and dried and then further processed into a storage stable product, e.g., a breakfast cereal or snack, such as, e.g., flakes, shreds, puffs, nuggets, strips, or chips, which are shelf stable even without the addition of substances to inhibit the development of rancidity.

The breakfast cereals and snacks of this invention have an both an enhanced shelf life due to the storage stability of the product and an enhanced bowl life as demonstrated by the prolonged crispiness, fracturability and buoyancy in liquid. For example, the product has a bowl life of at least 3 minutes and preferably at least 5 minutes as compared to a bowl life of only 1.5 minutes for a like product prepared from a non-waxy grain.

The products of this invention may comprise one or more kinds of waxy grains and the processes may be applied to combinations of waxy grains such that two or more waxy grains are processed together to produce a mixture of processed grains. Preferably the waxy grain has a high amounts of fiber and antioxidants. The products of this invention may be eaten alone, mixed into a dough or the processed waxy grains may be subsequently ground to a consistency suitable for use in a dough.

The cooked waxy grains of this invention may be partially or totally covered with an edible coating. For example, sucrose, dextrose, an edible wax, lipid, emulsifier or protein. For example, the waxy grain may be coated with rice syrup, carnauba wax, polymeric fructose, corn syrup solids, lipids, e.g., fats and oils (partially or fully hydrogenated), phospholipids, and emulsifiers, e.g., lecithin derived from vegetable sources such as soybean, safflower, corn, etc., fractionated lecithins enriched in either phosphatidyl choline or phosphatidyl ethanolamine or both, mono or diglycerides, sodium stearoly-2-lactylate, polysorbate 80, and commercially available mono- and diglycerides, saturated distilled monoglycerides and diacetyl tartaric acid esters of monoglycerides, monosodium phosphate derivatives of mono- and diglycerides of edible fats or oils, sorbitan monostearate, polyoxyethylene sorbitan monostearate, hydroxylated lecithin, lactylated fatty acid esters of glycerol and propylene glycol, polyglycerol esters of fatty acids, propylene glycol mono- and diester of fats and fatty acids, polyglycerol polyricinoleate, ammonium salts of phosphatidic acid, sucrose esters, oat extract, diacetyl tartaric acid esters of mono- and diglycerides or mixtures of these emulsifiers, proteins, e.g., gelatin, casein, caseinates, soy protein, whey protein and like products, plant resins and plant, microbial or synthetic gums, e.g., guar gum, gum arabic, locust bean gum, gum tragacanth, gum karaya and carrageenan, xanthan gum, dextran, low methoxyl pectin, propylene glycol, carboxymethyl locust bean gum and carboxymethyl guar gum and products that would improve texture and bowl life, e.g., low molecular weight fibers or carbohydrates, e.g., modified starches. The coating may be from about 5% to about 60% by weight of the final product.

Another aspect of this invention are edible compositions that comprise the waxy grains of this invention, particularly farinaceous compositions. For example, the cooked waxy grain of this invention may be mixed with other grains and flours and may be incorporated as an additive or replacement ingredient into other food products such as, e.g., R-T-E cereals, e.g., Special K™, Total™, or Product 19™, Muesli, granola grain clusters, snack bars, biscuits, crackers, bread, cakes, muffins, and pie crusts. The waxy grains of this invention may also be incorporated into candies, e.g., chocolate bars.

Additional ingredients may be added to the processed waxy grain during or after cooking. For example, natural or artificial sweeteners, spices, salts or flavorings may be added to the processed waxy grain. Examples of sweeteners that are suitable for use in this invention include, but are not limited to dextrose, rice syrup, corn syrup, sucrose, glucose or fructose oligosaccharides. Suitable spices include but are not limited to nutmeg, cloves, cinnamon, and allspice. Suitable flavorings include but are not limited to vanilla, a fruit extract, e.g., orange, lemon, strawberry, cherry, blueberry, or pineapple, and cocoa.

The methods disclosed herein are also applicable to pearled waxy grains. Pearling removes various proportions of the bran from the outer layers of whole grain. For example, a small amount of the bran may be removed, accounting for a loss of only about 1% of the dry weight of the grain, or essentially all the bran may be removed producing a white grain with essentially no brown color from the bran layer. Pearled grains produce a product that is preferred by some consumers. The grain may be pearled by any suitable method and preferably the pearled grain is pearled from about 1% to about 30% of the weight of the grain, preferably 1-20%. The methods of this invention produce a digestible, buoyant, storage stable food product from pearled waxy grain but the fiber levels may be reduced as compared to the non-pearled waxy grain due to the loss of the outer layers of the grain. Even though the fiber levels of these products may be reduced by the pearling, the product still retains its enhanced storage stability, without the addition of preservatives that inhibit rancidity, as evidenced by the reduced rate at which rancid odors and tastes are produced and the slow change in moisture content leading to an alteration in appearance, odor, taste and texture "staleness" after extended storage in an air tight or a conventional cereal container having a lining. Preferably, the product is stable for at least 6 months, more preferably 12 months without the addition of preservatives with inhibit the development of rancidity, and the processed waxy grain product maintains pleasing organoleptic properties, e.g., a fresh taste and a crisp texture.

The processed waxy grains of this invention have textures that are significantly different than processed non-waxy grains. The waxy grains have significantly less surface roughness and significantly enhanced crispness and buoyancy as compared to non-waxy products. The processed waxy grains do not become rancid even without the addition of preservatives, as determined by taste, texture or smell or by a measure of the hexanal content in the head space of the packaged product or the level of hexanal in the product itself. Those of skill in the art appreciate that the levels of hexanal that are considered acceptable depend on the type of grain and can be readily determined, e.g., by gas chromatography, see e.g., Feneley, *Accelerated Shelf-Life Testing of a Ready to Eat Cereal*, Masters Thesis, Dept. of food Science and Human Nutrition, Michigan State University (1998); Fritsch and Gale, "Hexanal as a measure of rancidity in low fat foods", J. Amer. Oil Chem. Soc. 54:225 (1976), incorporated herein by reference, for a discussion on hexanal content and its relationship to rancidity.

The following examples are intended only to further illustrate the invention and are not intended to limit the scope of the invention described herein.

Example 1

In this example the products were prepared from waxy barley or from waxy wheat.

Waxy barley with less than 1% residual hull attached (or waxy wheat) was received cleaned and was steamed in a rotary cooker for 7-10 minutes at 17 psi and then tempered at 165° F. (74° C.) for 1 hour prior to bumping.

The tempered barley (or wheat) was lightly bumped through a roller mill, just enough to crack the pericarp of the grain. The bumped barley (or wheat) was then added back to the rotary cooker and steamed 10-15 minutes at 17 psi (260° F., 127° C.). The cooker was depressurized and a mixture of sugar, salt, high fructose maize syrup, was then added. The cooker was then pressurized to 17 psi for approximately 30 to 40 minutes to gelatinize the starch throughout the grain. The barley (or wheat) was then cooled and individual grains were separated. The moisture content was about 30-33%. The individual grains were then dried for 20 minutes at 200° F. (94° C.) to a moisture range of 20% to 18%. The product was then equilibrated for 1 hour at ambient air. The equilibrated wheat was then rolled through a roller mill to form elongated thin berries approximately 0.004 inch thickness. The berries were then dried down to 14-12% moisture and then equilibrated for 24 hours. The dried equilibrated product was then expanded using a fluidized bed of air at 375° F. (190° C.) for 25 seconds. The moisture content of the expanded product was about 2.5-3%.

Example 2

In this example products were prepared from waxy barley or from waxy wheat.

The grain (waxy barley or waxy wheat) was processed as described in Example 1 until the drying step wherein the individual gelatinized grains were dried to a moisture content of 20% to 18%. The individual grains were mixed with a soy flour to about 25% of the total weight, and the mix of grain and flour were added to a pasta press and blended with water, about 10% of the total weight. The resulting product was extruded as a pellet using a press. The pellets were then dried to 16% moisture and flaked through a roller mill. The flakes were then toasted in a fluidized bed of air using the same procedure and temperatures as set forth in Example 1. The moisture content of toasted product was about 2.5 to 3%.

Example 3

In this example products were prepared from waxy barley or from waxy wheat.

| | |
|---|---|
| Waxy Grain (Hulless Barley CDC Candle or Waxy Wheat) | 20.00 lbs. |
| Sugar | 3.43 lbs. |
| Salt | .37 lbs. |
| High fructose corn syrup | .70 lbs. |
| Water | 3.74 lbs. |

Pre-Processing Procedure:

The waxy grain was washed and steeped in warm (120° F., 49° C.) water for 5 minutes and then put on a screen and drained. The grain was put in a large barrel and steamed using a live steam hose for 5 minutes. The steamed grain was left in a bucket to temper at 160° F.-200° F. (71° C.-93° C.) for 1 hour to increase the moisture content and loosen the pericarp. The grain was then bumped, similarly to an old fashion-rolled oat, through a small scale flaking mill. Fifty pounds of the bumped grain was produced.

Cooking Procedure:

A cooker was loaded with 20 pounds of the pre-processed grain. The grain was cooked for about 15 minutes by sealing the cooker and increasing the pressure at a rate sufficient to reach 16 psi in 9 minutes and then cooked for the remaining time with 16 psi steam (260° F., 127° C.). The pressure was released and flavor was added through an injection point and the flavors and grain were mixed for 5 minutes. The pressure was then put back on the cooker. The product was then cooked for 45 minutes at 16 psi (260° F., 127° C.).

The cooked waxy grain product was deposited into a tub and then air-cooled. The product was pulled apart into quarter size pieces. The quarter sized pieces were then sized through a pellet mill. The pellets were cooled and then air-dried for 5 minutes. The dried pellets were then flaked to 1½ cm to 2 cm in size. The flakes were dried at 190° F. for 15 minutes to 12-14% moisture. The dried flakes were toasted at 400° F. for about 25 seconds, which expanded the flakes to 3.5 cm to 4 cm in length and 2½ cm to 3 cm in width. The thickness was 0.66-0.76 mm and the cross flake thickness was 0.094-0.116 mm. The flakes were robust light and airy. The product floated and did not become soggy for at least 3 minutes in milk.

Example 4

| Dry Ingredients | |
|---|---|
| Whole Grain Waxy Barley Meal | 120.00 Kg |
| Sucrose | 9.00 Kg |
| Salt | 2.26 Kg |
| Corn oil | .53 Kg |
| Sodium Bicarbonate | .53 Kg |
| Liquid Premix | |
| Malt extract | .547 Kg |
| Corn Syrup/water | 6.08 Kg |
| Liquid Premix Ratio To Dry Ingredients | 5.00% |

The waxy barley was steamed and then held at 200-160° F. (93° C.-71° C.) for 1 hour for lipase deactivation. The waxy whole grain was the ground into a stable meal. The ground waxy barley was mixed with the remaining dry ingredients set forth above. The dry ingredients were mixed in a twin screw extruder and the liquid ingredients were injected into the mixed dry ingredients, mixed and the mixture was extruded in the form of a tubular dough. The temperature of the dough out of the extruder was about 286-291° F. (127-130° C.). The dough was then cooled and formed into pellets containing 20-25% moisture. The pellets were then sheeted and formed and dried to 10-12% moisture for 20 min at 165-183° F. (60-70° C.). The product was then puffed at about 400° F. (204° C.) 25 secs.

In an alternate embodiment, after the dry and liquid ingredients were mixed in a twin screw extruder, the mixture was then directly expanded from the die at an exit moisture of 6-9% and the product was then dried to 3%.

Example 5

To assay storage stability, the sensory attributes, aroma, taste and texture of waxy barley flakes prepared as described in Example 1 were evaluated by a professional cereal stability panels at 3, 6, 9 and 12 weeks of storage under hot room conditions wherein the temperature is 100° F. (37.8° C.), and the humidity is 70%, and at 2, 4, 6, 8, 10 and 12 months of storage under at 70° F. (21° C.), 35% relative humidity. The samples were also assayed for changes in moisture and water activity and for oxidative stability. The results are displayed in Tables 1 and 2 and FIGS. 3A and 3B and FIGS. 4A and 4B. Analysis of the time trend data was conducted using linear regression over time.

5a. Sensory Attributes after Storage

The waxy barley flakes did not develop a cardboard aroma, i.e., a musty, stale woody aromatic associated with wet cardboard, or a painty off taste, similar to linseed oil or oil-based paint, associated with oxidized oil, which are typical of rancid products, during the 12 week or 12 month storage.

5b. Chemical Analysis

Figure 1:
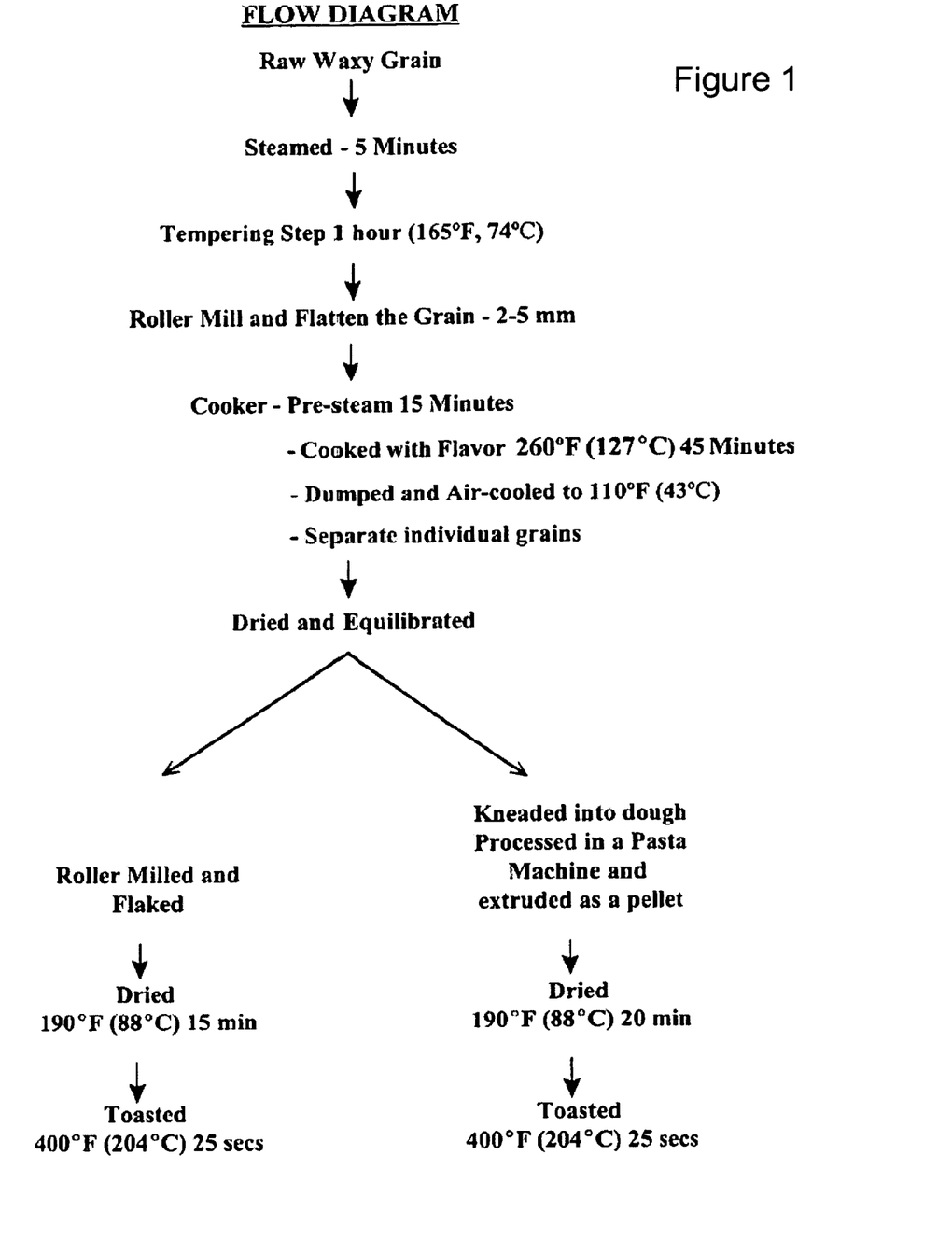
FIG. 1 is a flow chart of one embodiment of the invention.
Figure 2:
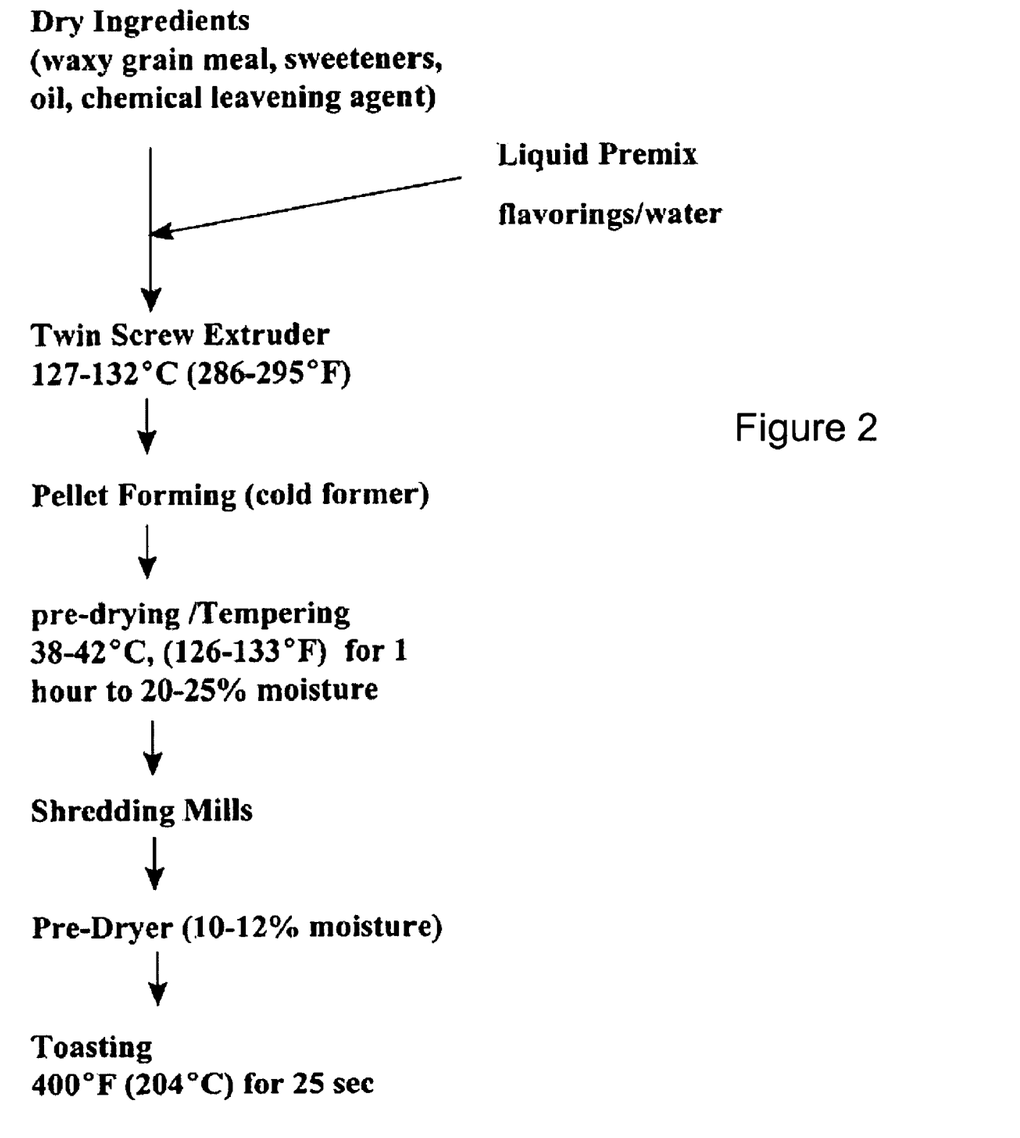
FIG. 2 is a flow chart of an alternate embodiment of the invention.
Figure 3:
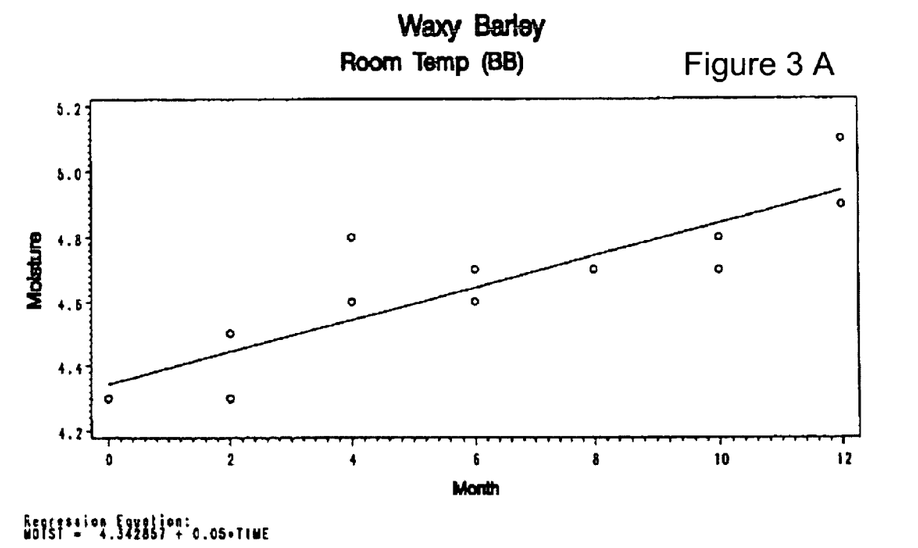
Figure 4:
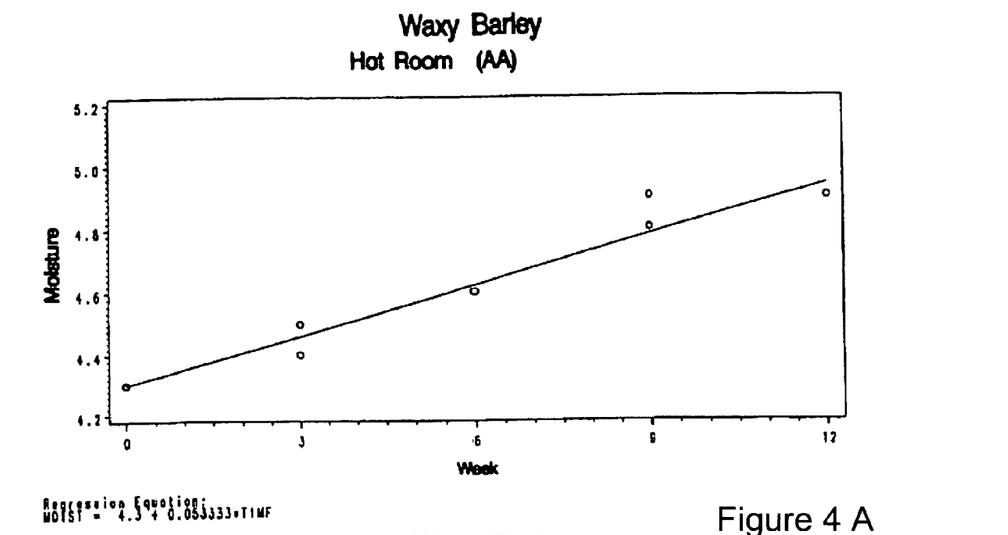

Chemical analyses of the water activity and moisture content of the waxy barley flakes indicated that the moisture and water activity increased slightly over time. When stored at 70° F. (21° C.), 35% relative humidity, the water activity increased by about 0.05% per month (FIG. 3A) and the water activity increased by about 0.009 per month (FIG. 3B). When stored under hot room conditions the water activity increased by about 0.5% per month (FIG. 4A) and the water activity increased by about 0.003 per month (FIG. 4B). Although the increases in the moisture and water activity were significantly different, they were low.

To assay for oxidative stability, the hexanal levels in the headspace of the test product were assayed. The hexanal levels remained low in the product throughout the test. A rapid increase in the accumulation of hexanal, known as the time of break point that is associated with consumers detecting rancidity, was not observed.

TABLE 1

Sensory Attributes - Hot Room (100° F., 37.7° C., 35% RH)

| Attributes | Initial | 3 Weeks | 6 Weeks | 9 Weeks | 12 Weeks |
|---|---|---|---|---|---|
| Cardboard Aroma | 0.0 | 0.0 | 0.3 | 0.4 | 0.2 |
| Painty Aroma | 0.0 | 0.0 | 0.0 | 0.0 | 0.1 |
| Cardboard Flavor | 0.0 | 0.0 | 0.1 | 0.3 | 0.2 |
| Painty Flavor | 0.0 | 0.0 | 0.0 | 0.0 | 0.0 |
| Hardness | 8.0 | 6.5 | 7.5 | 7.6 | 7.7 |
| Crispness | 8.9 | 9.0 | 9.0 | 8.9 | 8.6 |

0-5 = Slight;
6-10 = Moderate;
11-15 = Strong

TABLE 2

Sensory Attributes - Room Temperature (70° F., 21.1° C., 35% RH)

| Attributes | Initial | 2 mos. | 4 mos. | 6 mos. | 8 mos. | 10 mos. | 12 mos. |
|---|---|---|---|---|---|---|---|
| Cardboard Aroma | 0.0 | 0.3 | 0.3 | 0.2 | 0.0 | 0.3 | 0.3 |
| Painty Aroma | 0.0 | 0.0 | 0.0 | 0.0 | 0.0 | 0.0 | 0.1 |
| Cardboard Flavor | 0.0 | 0.0 | 0.3 | 0.1 | 0.3 | 0.1 | 0.2 |
| Painty Flavor | 0.0 | 0.0 | 0.0 | 0.0 | 0.0 | 0.0 | 0.0 |
| Hardness | 8.0 | 7.4 | 7.9 | 7.7 | 7.8 | 8.0 | 7.7 |
| Crispness | 8.9 | 9.0 | 8.8 | 8.6 | 8.6 | 8.4 | 9.1 |

0-5 = Slight;
6-10 = Moderate;
11-15 = Strong

We claim:

1. Process for preparing a cooked, buoyant, wholegrain waxy wheat, comprising: (a) hydrating a wholegrain waxy wheat having no more than 10% amylose to a grain moisture content of from 11 to 16% by heating the wholegrain waxy wheat for about 5 to about 15 minutes at about 200° F. (94° C.) to 230° F. (110° C.) with moist heat, then tempering the wholegrain waxy wheat having a grain moisture content of from 11 to 16% for about 1 hour to about 2 hours, (b) cooking the tempered wholegrain waxy wheat to fully gelatinize it throughout, and (c) cooling and drying the fully gelatinized wholegrain waxy wheat, wherein said wholegrain waxy wheat product is storage stable for at least about six months in the absence of additives that inhibit development of rancidity.

2. Process of claim 1, wherein said tempering is about 1 hour at ambient temperature.

3. Process of claim 1, wherein said tempering is for about 1 hour at about 160° F. (71° C.) to about 200° F. (93° C.).

4. Process of claim 1, wherein the waxy wheat in step (b) is heated for about 45 minutes to about 90 minutes at 200° F. (93° C.) to about 350° F. (177° C.) to gelatinize the waxy wheat.

5. Process of claim 1, wherein the waxy wheat in step (b) is heated for about 1 hour at about 260° F. (127° C.).

6. Process of claim 1, further comprising separating the cooled waxy wheat in step (c) into separate kernels prior to drying.

7. Process of claim 6, further comprising toasting the separated dried kernels.

8. Process of claim 6, further comprising drying the separated kernels to a moisture content of 10 to 16% then heating the kernels to about 380° F. (193° C.) to about 700° F. (371° C.) for 15 to 25 seconds.

9. Process of claim 1, wherein flavorings are added to the waxy wheat prior to, during or after gelatinization.

10. Process of claim 1, wherein the waxy wheat comprises a protein content of about less than 14% by weight.

11. Process of claim 1, wherein the waxy wheat comprises Wx-D1 null, Wx-A1 or Wx-B1 null allele.

12. Process of claim 1, further comprising kneading the gelatinized and cooled waxy wheat of step (c) under low shear to form a dough.

13. Process of claim 12, further comprising shaping and drying the dough to a moisture content of 10 to 16%.

14. Process of claim 13, wherein further comprising toasting or puffing the shaped dough.

15. Process of claim 14, wherein the dried dough is puffed by heating the shaped dough to about 380° F. (193° C.) to about 700° F. (371° C.).

16. Process of claim 1, wherein the waxy wheat comprises a protein content of less than 14% by weight of the grain.

17. Process of claim 1, further comprising puffing or toasting the dried waxy wheat of step (c).

18. Process for preparing a cooked, buoyant, wholegrain waxy wheat, comprising (a) hydrating a wholegrain waxy wheat having no more than 10% amylose to a grain moisture content of from 11 to 16% by heating the wholegrain waxy wheat for about 5 to about 15 minutes with steam at a temperature of from about 200° F. (94° C.) to 230° F. (110° C.), (b) then tempering the heated waxy wheat having a grain moisture content of from 11 to 16% for about 1 to about 2 hours followed by bumping the tempered wholegrain waxy wheat, (c) cooking the tempered waxy wheat for about 45 minutes to about 90 minutes at 200° F. (93° C.) to about 350° F. (177° C.) to fully gelatinize the wholegrain waxy wheat throughout, (d) cooling and separating the gelatinized wholegrain waxy wheat, and then (e) drying the separated wholegrain waxy wheat to a moisture content of about 10% to 16%, wherein said wholegrain waxy wheat product is storage stable for at least about six months in the absence of additives that inhibit development of rancidity.

19. Process of claim 18, further comprising puffing or toasting the wholegrain waxy wheat of step (e).

20. Process of claim 1, wherein the waxy wheat of step (a) is milled after heating and prior to gelatinizing to produce a ground meal.

21. Process of claim 20, further comprising shaping the gelatinized ground meal and drying to a moisture content of about 10% to 16%.

22. Process of claim 20, wherein the ground meal is gelatinized in a rotary cooker or a cooker-extruder having a die face.

23. Process of claim 20, further comprising extruding the gelatinized ground meal and forming the extruded ground meal into a product of a desired shape.

24. Process of claim 23, further comprising toasting or puffing said shaped product.

25. Process of claim 23, wherein the shaped product is puffed by heating to about 380° F. (193° C.) to about 700° F. (371° C.).

26. Process of claim 20, wherein the ground meal is gelatinized in a cooker-extruder and directly expanded.

27. Process of claim 1, further comprising milling the gelatinized wholegrain waxy wheat of step (c) to produce a ground meal.

28. Process of claim 27, wherein said ground meal is formed into a product having a desired shape.

29. Process of claim 28, wherein the shaped product is a flake, shred, puff, nugget, strip or chip.

30. Process of claim 28, wherein the shaped product is toasted or puffed.

31. Process of claim 28, wherein the shaped product is dried to a moisture content of about 10% to 16%.

32. Process of claim 28, further comprising toasting or puffing the dried shaped product.

33. Process of claim 1, wherein the waxy wheat in step (c) is bumped, flaked, puffed or toasted.

34. Process of claim 1, wherein the waxy wheat is gelatinized in a cooker-extruder having a die face and is directly expanded at the die face.

35. Process of claim 34, wherein the directly expanded gelatinized waxy wheat is toasted.

* * * * *

UNITED STATES PATENT AND TRADEMARK OFFICE
CERTIFICATE OF CORRECTION

| | | |
|---|---|---|
| PATENT NO. | : 7,935,376 B2 | Page 1 of 1 |
| APPLICATION NO. | : 11/356763 | |
| DATED | : May 3, 2011 | |
| INVENTOR(S) | : Lori Ann Wilson et al. | |

It is certified that error appears in the above-identified patent and that said Letters Patent is hereby corrected as shown below:

Column 1, Line 49: "colin" should read -- colon --.

Signed and Sealed this
Eleventh Day of October, 2011

David J. Kappos
*Director of the United States Patent and Trademark Office*